US012150463B2

(12) United States Patent
Weinberger et al.

(10) Patent No.: US 12,150,463 B2
(45) Date of Patent: Nov. 26, 2024

(54) METHOD FOR THE PRODUCTION OF PROTEIN-CONTAINING FOODS (71) Applicant: BÜHLER AG, Uzwil (CH)

(72) Inventors: Michael Weinberger, Brugg (CH); Erich Stirnemann, Zürich (CH); Erich Windhab, Zürich (CH); Bhaskar Mitra, Zürich (CH)

(73) Assignee: Bühler AG, Uzwil (CH)

( * ) Notice: Subject to any disclaimer, the term of this patent is extended or adjusted under 35 U.S.C. 154(b) by 454 days.

(21) Appl. No.: 17/636,572

(22) PCT Filed: Aug. 20, 2020

(86) PCT No.: PCT/EP2020/073444
§ 371 (c)(1),
(2) Date: Feb. 18, 2022

(87) PCT Pub. No.: WO2021/032866
PCT Pub. Date: Feb. 25, 2021

(65) Prior Publication Data
US 2022/0295827 A1 Sep. 22, 2022

(30) Foreign Application Priority Data

Aug. 20, 2019 (EP) .................... 19192660
Oct. 9, 2019 (EP) .................... 19202278
Jul. 3, 2020 (EP) .................... 20184014

(51) Int. Cl.
A23J 3/26 (2006.01)
A23J 3/14 (2006.01)
A23J 3/20 (2006.01)
A23J 3/22 (2006.01)
A23P 30/25 (2016.01)
A23P 30/40 (2016.01)

(52) U.S. Cl.
CPC . A23J 3/26 (2013.01); A23J 3/14 (2013.01); A23J 3/20 (2013.01); A23J 3/227 (2013.01); A23P 30/25 (2016.08); A23P 30/40 (2016.08)

(58) Field of Classification Search
None
See application file for complete search history.

(56) References Cited

U.S. PATENT DOCUMENTS

| | | | |
|---|---|---|---|
| 4,315,949 | A | 2/1982 | Schroder |
| 5,665,419 | A | 9/1997 | Teraguchi et al. |
| 6,207,214 | B1 | 3/2001 | Kim |
| 6,565,900 | B2 | 5/2003 | Roussel et al. |
| 2004/0166203 | A1 | 8/2004 | Gautam et al. |
| 2004/0199492 | A1* | 10/2004 | Maniak .................. A21D 8/025 |
| 2012/0064209 | A1 | 3/2012 | Ardisson-Korat et al. |
| 2013/0136830 | A1 | 5/2013 | Ganjyal |
| 2015/0289542 | A1 | 10/2015 | den Dulk |
| 2015/0296835 | A1 | 10/2015 | Anderson et al. |

FOREIGN PATENT DOCUMENTS

| | | |
|---|---|---|
| DE | 27 42 083 A1 | 3/1979 |
| DE | 44 22 658 A1 | 1/1995 |
| DE | 100 08 293 A1 | 11/2000 |
| DE | 10 2014 107 610 A1 | 12/2015 |
| EP | 1 059 040 A1 | 12/2000 |
| GB | 1 552 091 | 9/1979 |
| WO | 96/34539 A1 | 11/1996 |
| WO | 00/69276 A1 | 11/2000 |
| WO | 2008/019423 A1 | 2/2008 |
| WO | 2008/036906 A1 | 3/2008 |
| WO | 2011/011456 A2 | 1/2011 |
| WO | 2012/158023 A1 | 11/2012 |
| WO | 2016/150834 A1 | 9/2016 |
| WO | 2017/070303 A1 | 4/2017 |
| WO | 2017/174518 A1 | 10/2017 |
| WO | 2019/104069 A1 | 5/2019 |
| WO | 2019/173306 A1 | 9/2019 |

OTHER PUBLICATIONS

Elyssa Chan et al., "Effects of Different Blowing Agents on Physical Properties of Extruded Puffed Snacks Made from Yellow Pea and Red Lentil Flours", Journal of Food Process Engineering, Bd. 42, Nr. 3, Jan. 13, 2019.
European Search Report Corresponding to EP19192660.9 mailed Jan. 3, 2020.
K.Y. Cho et al., "New Generation of Healthy Snack Food by Supercritical Fluid Extrusion", Journal of Food Processing and Preservation, Bd. 34, Nr. 2, 2010, pp. 192-218.
Extended European Search Corresponding to 19202278.8 mailed Mar. 26, 2020.
Jette Feveile Young et al., "Cultured Meat on a Plant-Based Frame", Nature Food, vol. 1, No. 4, Mar. 30, 2020, pp. 195-195.
International Search Corresponding to PCT/EP2020/073444 mailed Dec. 7, 2020.
Written Opinion Corresponding to PCT/EP2020/073444 mailed Dec. 7, 2020.
European Office Action Corresponding to 19202278.8 mailed Jul. 17, 2024.
Korean Office Action Corresponding to 10-2022-7008674 mailed Jul. 30, 2024.

* cited by examiner

Primary Examiner — Jyoti Chawla
(74) Attorney, Agent, or Firm — Finch & Maloney PLLC (57) ABSTRACT The present invention relates to a method for producing protein-containing foamed food products, comprising the steps: metering raw materials into an extruder, wherein at least one raw material is a protein, mixing the raw materials into the extruder to produce a mixture, extruding the mixture to produce an extrudate, and leading the extrudate out of the extruder through a cooling die with cooling of the extrudate to a temperature of less than 100° C., wherein pores are formed in a controlled manner in the extruder, by providing a gas, by introducing the gas into the extruder or by forming the gas based on a reaction of a gas-forming compound added as a raw material with a gas-releasing compound added as a raw material.

16 Claims, 9 Drawing Sheets

METHOD FOR THE PRODUCTION OF PROTEIN-CONTAINING FOODS

The present invention relates to novel foamed and textured, protein-rich food products from at least one dry raw material having a protein content of more than 50% by weight, preferably between 60% by weight and 90% by weight, in particular based on vegetable proteins, insect proteins, cell proteins, such as of yeast, bacteria, microalgae, mould and the like, or a mixture of different proteins. Such foods, in the following, are also called protein-containing texturates, and according to a preferred embodiment alternative meat products ("meat alternatives"). The present invention also relates to a method of producing such novel foamed and textured, protein-rich food products.

Novel food products such as meat substitutes that are based on vegetable proteins are becoming increasingly important as part of the sustainability trend. Conventional methods for their production usually contain the following steps:
  weighing/dosing the raw materials,
  mixing the raw materials,
  preconditioning (optional),
  extruding, in particular with the aid of a cooling die,
  cutting.

A major challenge for the acceptance of alternative meat products is to match their texture, their color and their organoleptic properties (bite) as far as possible to the corresponding properties of real meat products. However, the alternative meat products produced using the known methods and methods available on the market differ significantly from real meat in their texture, their color and their bite. This applies to the fibrousness as well as the tenderness or juiciness of the previously available meat substitutes. In general, each novel food product faces the same challenges as to texture, colour and bite, in order to get consumer acceptance.

The reasons for the above differences are that a very high-energy process is involved in which thermal energy (heating the extruder housing and cooling water in a cooling die or introduction of steam into the system) and mechanical energy (specific mechanical energy input) are introduced. However, an increased supply of energy in the process inevitably leads to a stronger texturing, which in turn has a negative effect on the bite or the tenderness of the end product—the products have a rubber-like character.

It is also necessary to freeze the extrudate (end product) for following the extrusion process due to high moisture content of the product. The freezing process modifies the texture in such a way that the inclusion of a second phase becomes possible and thus the bite and juiciness of the extrudate are positively influenced. As an alternative to freezing, the extrudates are cooked and/or subjected to vacuum coating. Both method steps enable the inclusion of a second phase, but are also very complex.

EP 1 059 040 A1 describes a method in which protein-rich material was processed in an extruder and cooled to a temperature of 100° C. or less by being led out through a cooling die arranged at the end of the extruder.

WO 96/34539 A1 describes a method in which protein-rich material was processed in an extruder and cooled by being led out through a cooling die arranged at the end of the extruder. The product obtained in this way is not sufficiently similar to real meat.

WO 2012/158023 A1 describes a method for producing a soybean protein extrudate from an aqueous soy protein composition by extrusion. The composition having at least 50% by weight of water is cooled to no more than the boiling point of water under the prevailing ambient conditions (that is, at 100° C. under normal pressure) when leaving the extruder. The product obtained in this way has a comparatively open-pore structure and its properties can be modified by infusing a corresponding liquid into these pores.

With this method, the pore structure in the extruded product caused by the formation of water vapor when leaving the extruder is purely random. In addition, the pore variance depends on the protein used, its concentration and the process control. However, the multitude of parameters and their interrelationships are complex, and constant product quality is only guaranteed in a very narrow framework. Pore quality can thus only be moderately controlled via the process control. A targeted influence on micro-pore formation is not possible.

It is an objective of the present invention to overcome the disadvantages of the prior art. In particular, protein-rich foamed food products having a pore quality that is as homogeneous as possible, and having acceptable texture and color properties should be able to be produced in a controlled manner in order to improve, among other things, the bite and tenderness of the product. Furthermore, other phases should also be able to be included into the product without the methods steps of freezing, cooking or vacuum coating required in the prior art. The energy required for production should also be reduced as much as possible.

This objective is achieved obtaining the protein-rich foamed product and inventing the method of its manufacture according to the independent claims.

The method according to the invention for the production of protein-containing foamed food products comprises the following steps:
  a) metering raw materials into an extruder, wherein at least one raw material is a protein, preferably a vegetable protein, insect protein, cell protein, such as of yeast, bacteria, microalgae, mould and the like, or a mixture of different proteins, wherein the protein content in the dry raw materials is greater than 50% and is particularly preferably in the range from 60% to 90%, and the starch content in the dry raw materials is not more than 50%, preferably in the range from 5 to 30%, and the raw materials comprise at least one component which has a fiber content,
  b) mixing the raw materials in the extruder to produce a mixture,
  c) extruding the mixture to produce an extrudate, wherein the solids content of the extrudate is in the range from 20% to 60%, preferably in the range from 30% to 50%,
  d) leading the extrudate out of the extruder through a cooling die while cooling the extrudate to a temperature of less than 100° C.,
wherein pores are formed in a controlled manner in the extruder by providing a gas so as to provide after step d) a foamed product having a protein content in the range from 15-30 wt.-%, preferably 19-23 wt.-% and a liquid content, preferably water content, of 45-70 wt.-%, preferably 55-65 wt.-%.

It has been found according to the invention that controlled pore formation in a foamed food product, preferably an alternative meat product, and an associated adaptation of the product properties to the properties of real meat can be achieved by providing a gas in an extruder during the extrusion process. In contrast to the method of WO 2012/158023 A1, the pore formation is controlled by the method according to the invention, since a specific control of the pore formation process, in particular of pores which are at least partially interconnected, is possible by providing a specific amount of gas.

The provision of a gas during the production of baked goods or similar foods, such as snack product or breakfast cereals, is known. In U.S. Pat. No. 6,207,214, during the production of Korean baked goods through extrusion, $CO_2$ is introduced into the extruder. However, these are fundamentally different products than the presently related protein-rich foamed food products, preferably alternative meat products, which have high protein content, which differ greatly in terms of their properties.

According to the present invention, a gas is understood to mean a substance which is gaseous under normal conditions (1 bar, 20° C.). Examples of gases which can be used according to the present invention are $CO_2$, $N_2$, $N_2O$, $NH_3$ or $SO_2$.

According to the present invention, a gas is provided in the extruder in order to achieve a controlled pore formation in the treated material. According to the invention, this provision can take place by
  introducing the gas into the extruder via a feed opening, and/or
  releasing the gas in the extruder by a reaction between a gas-forming compound added as a raw material with a gas-releasing compound added as a raw material.

According to one embodiment of the present invention, the raw materials therefore may contain at least one gas-forming compound and at least one gas-releasing compound. During the extrusion in step c), a gas is formed by a chemical reaction of the gas-forming compound with the gas-releasing compound.

According to the invention, a gas-forming compound is understood to mean a substance which, under the conditions prevailing in the extruder, is reacted with a suitable gas-releasing compound to release a gas. Typical examples of a gas-forming compound are physiologically acceptable salts such as carbonates or hydrogen carbonates, for example, sodium carbonate ($Na_2CO_3$), potassium carbonate ($K_2CO_3$), or sodium hydrogen carbonate ($NaHCO_3$), from which $CO_2$ can be released. Another example is staghorn salt (a mixture of ammonium hydrogen carbonate ($NH_4HCO_3$), ammonium carbonate (($NH_4)_2CO_3$) and ammonium carbamate ($NH_4CO_2NH_2$)), from which the gases $NH_3$ and $CO_2$ can be released.

A gas (particularly preferably $CO_2$) can be released from these gas-forming compounds by reaction using a gas-releasing compound. This can be any chemical compound that reacts with the corresponding gas-forming compound to form gas. The gas-releasing compound is usually a physiologically acceptable acid. The acid can be, for example, citric acid, a phosphoric acid compound such as disodium dihydrogen diphosphate or monocalcium orthophosphate, tartaric acid or one of its salts (such as potassium sodium tartrate (Rochelle salt)), malic acid, fumaric acid, adipic acid or glucono delta-lactone. The acids can be used as free acids or in the form of their anhydrides or salts.

According to the present invention, the gas to be provided is preferably produced in this embodiment by an acid-base reaction in the extruder. For example, the gas carbon dioxide ($CO_2$) can be produced by reaction of the salt sodium hydrogen carbonate ($NaHCO_3$) with citric acid ($C_6H_8O_7$).

The texture of the extrudate can be influenced in a targeted manner by a suitable choice of the gas-forming compound and the gas-releasing compound, preferably the salt and the acid, and their proportions by weight. A controlled inclusion of a second phase and possibly further phases is made possible in this way. This ensures an improved absorption of water or flavoring components such as bouillons, fats or oils, which has a positive effect on the bite behavior of the extrudates.

The gas-forming compound and the gas-releasing compound, preferably the salt and the acid, can be added to or are added to dry raw materials which are metered into the extruder. Alternatively, the acid can also be fed separately to the extruder in liquid form.

The gas-forming compound and the gas-releasing compound are preferably present together in the raw materials in a proportion of 0.1% by weight to 5% by weight, particularly preferably 0.2% by weight to 1.6% by weight, based on the total weight of all raw materials metered into the extruder. The mass ratio of gas-forming compound to gas-releasing compound, preferably salt to acid, depending on the stoichiometric ratios of the corresponding reaction, is preferably in the range from 1:1 to 6:1 in order to achieve the most complete gas release possible.

According to a further embodiment of the present invention, the gas is provided in the extruder by introducing the gas into the extruder.

According to this embodiment of the present invention, at least one gas is thus introduced into the extrudate during the extrusion in step c). This is usually done through a feed opening of the extruder, which is connected to a gas container (such as a pressure bottle) and allows a controlled introduction of gas into the extruder (for example, via a valve).

Examples of gases which can be used according to the invention in this embodiment are $CO_2$, $N_2$, $N_2O$, $NH_3$ or $SO_2$, preferably $CO_2$ or $N_2$. The gas can be introduced in the gaseous state or alternatively as a liquefied gas.

The introduction of a gas also ensures controlled pore formation. If $SO_2$ is used, there is a possible formation of disulfide bridges with the proteins contained in the raw material, which results in an additional influence on the texture of the product. The gas can, for example, be introduced into the extruder in an amount of 0.01 to 5% by weight, preferably 0.05 to 2.5% by weight, based on the total weight of the raw materials metered into the extruder. For example, the gas may also be introduced in a quantity of 0.5 to 3.0 g (grams), preferably 1.0 to 1.5 g, of gas per kg (kilogram) of raw materials extruded in the extruder, after they have left the extruder.

According to the present invention, the gas is preferably introduced into the extruder at a pressure in the range from 10 to 50 bar, preferably 15 to 30 bar. According to the present invention, the extrudate, at the position of the feed opening for the gas in the extruder, has a temperature in the range from 80 to 180° C., preferably 120-170° C., particularly preferably 130 to 160° C.

According to the present invention, raw materials are metered into an extruder, wherein at least one raw material is a protein, preferably a vegetable protein, insect protein, cell protein, such as of yeast, bacteria, microalgae, mould and the like, or a mixture of different proteins. The term "wherein at least one raw material is a protein" also encompasses embodiments in which the raw material contains a protein or constitutes a protein source.

Plants are preferably used as protein sources, for example, legumes (such as peas, lupins or beans, for example, fava beans), cereals (such as wheat, soybeans, rapeseed or sunflowers), or algae. However, animal proteins such as milk protein or whey protein or proteins from muscle meat or connective tissue can also be used. However, it is preferred according to the invention to produce products which are free from animal proteins. For example, insect proteins, cell proteins, especially from yeast, bacteria, microalgae, mould and the like can also be used.

According to the present invention, the raw materials preferably comprise at least one component which has a fiber content. Pea fibers which have a fiber content of at least 50% of their dry weight may be mentioned by way of example.

The protein-containing raw materials are dosed into the extruder together with a liquid. As stated above, this is at least one protein-containing raw material as described above and one liquid as described above. Optionally, a gas-forming compound and a gas-releasing compound can be added if the gas is to be provided by releasing the gas via a chemical reaction of these compounds.

Water, bouillon and/or an oil-containing substance such as an oil-containing flavoring component can be used as liquids.

According to the invention, the protein-containing raw materials and the liquid are metered in such a ratio that the protein content in the dry raw material is greater than 50% and is particularly preferably in the range from 60% to 90%. Accordingly, the starch content (carbohydrate content) in the dry raw material is no more than 50%, preferably in the range from 5 to 30%.

In addition, additives commonly used for the production of alternative meat products can be added. For example, salts such as sodium chloride, fats, oils or other lipids can be added, preferably in an amount of 0.1 to 10% by weight, based on the total weight of all dry raw materials.

The method according to the invention is used for the production of wet texturates. A wet texturate is understood to mean an extrudate in which the solids content of the extrudate in step c) is in the range from 20% to 60%, preferably in the range from 30% to 50%. The remaining 80 to 20%, preferably 70 to 50%, are one of the liquids mentioned above, preferably water. For wet texturates, it has proven to be advantageous when the protein content in the dry raw materials is greater than 50% and is particularly preferably in the range from 60% to 90%.

According to the invention, commercially available extruders can be used which are used in the prior art for the production of corresponding food products. Examples include the extruders mentioned in WO 2012/158023 A1 or the extruders, in particular twin-screw extruders, from Bühler. Such extruders preferably have an L/D ratio (length to diameter) in the range from 20 to 60, preferably 25 to 50, and particularly preferably 25 to 40. According to the invention, the extruders are preferably operated at 300 to 500 rpm, particularly preferably 350 to 400 rpm.

The previously weighed raw materials are metered into a first section of the extruder. Alternatively, the different raw materials can also be added to the extruder sequentially in different sections.

One or more of the raw materials can be preconditioned before step a) of metering into the extruder. The residence time of the protein matrix in the process can be influenced in this way. It is currently assumed that a longer residence time leads to an improved fiber structure, since an increased number of cross-linked filaments is then produced during extrusion. According to the invention, the residence time in the preconditioner is preferably 3 to 600 s, particularly preferably 3 to 60 s, particularly preferably 5 to 15 s.

The metered raw materials are mixed with one another in the extruder, so that a liquid, preferably aqueous, protein composition is formed. The mixer can be configured as a high-speed mixer. It can have a water and steam feed line.

The extruder can have a water feed line and optionally a steam feed line. The liquid, preferably aqueous, protein composition is processed in the extruder. The composition here is heated above the denaturation temperature of the protein, preferably to a temperature in the range from 80 to 180° C., more preferably 120 to 160° C., particularly preferably 130 to 150° C., depending on the protein used. The housing of the extruder is preferably temperature controlled. The composition is kneaded under pressure (usually 1 to 60 bar, preferably 8 to 20 bar, particularly preferably 10 to 15 bar) to form a homogeneous mixture. This usually involves an energy input of 10 to 120 Wh/kg, preferably 15 to 30 Wh/kg.

The method according to the present invention can, in principle, be operated with a throughput in the range from 10 to 600 kg/h. According to the present invention, the process is preferably performed with a throughput of 10 to 60 kg/h, preferably 20 to 50 kg/h and particularly preferably 30 to 40 kg/h, or alternatively with a throughput of 100 to 600 kg/h, preferably 300 to 600 kg/h and particularly preferably 400 to 550 kg/h, wherein the material in the extruder preferably has a holding time (residence time) of at least 2 minutes, preferably at least 4 minutes.

The gas introduced according to one embodiment of the method according to the present invention can be introduced at different positions on the extruder, either close to the entrance region, in the middle region or in the exit region. According to the invention, the feed opening for the gas is preferably located in a section of the extruder which is located in the vicinity of the cooling die (that is, at the extruder outlet), preferably in the last third of the extruder length in front of the cooling die, particularly preferably in the last quarter of the extruder length in front of the cooling die.

According to a preferred embodiment of the present invention, instead of a conventional conveying element, there is a kneading and/or mixing element at the position of the feed opening for the gas in the extruder for intensively mixing the introduced gas with the extrudate, so that the gas is dispersed in the extrudate. Such elements are known. So-called Igel screws, barrier screws, T-elements (for example, from Extricom) may be mentioned as examples. They give a low energy input into the product with a simultaneous high distributive and dispersive mixing effect.

The present invention thus also relates to the use of an extruder, comprising a gas feed unit and a kneading and/or mixing element provided at the position of the gas feed unit, for producing a protein-containing food, preferably according to the method of the present invention described here.

After the extrusion in step c), in a further step d) the extrudate is led out of the extruder through a cooling die in order to bring the extrudate below the boiling point of water, that is, to a temperature below 100° C. under normal conditions. Cooling dies for extruders are sufficiently known. According to the invention, the extrudate is preferably cooled to a temperature in the range from 50 to 90° C.

The resulting foamed product has a protein content in the range from 15-30 wt.-%, preferably 19-23 wt.-%, and a liquid content, preferably water content, of 45-70 wt.-%, preferably 55-65 wt.-%. Preferably, the resulting foamed product has homogeneously distributed pores having a diameter of approximately 0.1-1 mm with a narrow size distribution, and more preferably additionally homogeneously distributed closed cavities.

In order to achieve improved wall sliding in the cooling die and thus easier process control, according to a preferred embodiment, oil can be injected into a distribution body of the extruder and/or into the cooling die itself, for example, in a proportion in the range from 1% to 10%, preferably in the range from 2% to 6%, particularly preferably in the range from 3% to 4%, based on the total weight of all raw materials metered into the extruder. For example, an edible oil such as sunflower oil is used. One or more feed lines for additives, e.g. for oil, fat or calcium and/or alginate, are provided, whereby this feed line opens advantageously close to or into the cooling die. Preferably the feed line transports the additive into the extrudate.

A combination of calcium compounds and alginates can influence juiciness, as it causes at least partial gelation of the product. The calcium compounds and alginate can be added at different times or simultaneously—also as a mixture. It is advantageous to add the calcium compounds and the alginate after the gas is added, but before the extruded product solidifies.

The extrudate can be cut into suitable shapes and sizes in a further step in a known manner after exiting the extruder, especially the pores can be made at least partially accessible from the outside.

The dispersed gas fraction and the gas bubble size/size distribution have a quantitative influence on the texture properties (for example, "bite and chewing properties" such as tenderness, hardness, chewability) and make it possible to adapt these sensory properties by adapting the structural parameters to the dispersed gas phase. It is assumed that an increase in the gas fraction (up to a matrix-specific critical value) and a reduction in the bubble size (with a constant gas volume fraction) lead to a stiffening of the structure. This leads to an increase in hardness, which is expressed by the maximum force required to start the structural break when cutting/biting, but increases the deformation required for the break and thus influences the chewability. Accordingly, the foaming of the matrix expands the spectrum of tools for adapting, for example, meat-analog bite/chewing properties from chicken to beef and beyond.

In contrast to methods described in the state of the art, for example for producing bread dough or snack products, the method according to the present invention is conducted at a temperature where denaturation of the proteins present in the raw material takes place. Also, the method according to the present invention is conducted at a temperature where the starch crystals melt ("gelatinization"). According to the present invention, in the extruder a temperature is applied which is, for example, in the range from 80° C. to 180° C., preferably in the range from 120° C. to 170° C., particularly preferably in the range from 130 to 160° C. In the methods described in the art, lower temperatures are used in order to avoid denaturation of the proteins or "gelatinization". Also, bread doughs are typically not extruded through a cooling die, but rather subjected to subsequent baking processes in order to solidify their structure.

According to the invention, protein-containing foamed food products (that is, foods having a protein content of more than 50% dry weight) can be produced which correspond, for example, to meat products in their texture, color and bite, more than protein-containing foods from the prior art. However, according to the present invention also other foamed protein-containing food products (having a protein content of more than 50% dry weight) can be provided. For example, mousse-like food products with a higher structural stability than real mousse can be obtained.

Particularly advantageous protein-containing food products can be obtained by the method according to the invention involving the step of introducing gas into the extrudate.

Protein-containing food products produced by the method according to the invention using the addition of a gas-forming and a gas-releasing substance typically have a maximum overrun (that is, a height exceeding the height of the extruder outlet and thus an enlarged volume of the sample) of 150%, preferably 100%, and/or homogeneously distributed pores having a diameter of about 0.1-1 mm, preferably 0.7-0.7 mm, with a narrow size distribution.

Protein-containing food products produced according to the invention using the introduction a gas typically have a maximum overrun (that is, a height exceeding the height of the extruder outlet and thus an increased volume of the sample) of 150%, preferably 100%, and/or homogeneously distributed pores having a diameter of approximately 0.1-0.3 mm with a narrow size distribution.

According to the present invention, "narrow size distribution" means that the diameter of at least 80%, preferably at least 90% the individual pores only deviates by 0.1-10%, preferably 0.2-5%, from the values indicated above.

The average area of a pore or a cavity formed by several interconnected pores is $21'292 \pm 36'110$ μm$^2$ with an average minimum and maximum diameter of $125 \pm 73$ μm and $239 \pm 153$ μm, respectively.

The pores and the pore distribution can be analyzed by microscopy or x-ray tomography, as known in the art.

The color of the protein-containing foamed food product produced according to the invention is significantly lighter than that of comparable protein-containing food produced without foaming. The color is measured using a conventional spectrophotometer with SCI (Specular Component Included). The sample to be measured must have a sufficiently thick layer so that no light is transmitted through the sample material and the measuring opening is completely covered with sample material. Reflection measurements are performed by means of a d/8° measurement geometry and with daylight (D65). L*, a*, b*, and C* values are determined. The L* value indicates the brightness, while a positive a* value indicates the color red. A positive b* value formulates the yellowness of the material. The chroma is represented by means of the C* value.

The (synthetic) protein-containing food produced according to the invention is distinguished by an L* value which deviates from the L* value of a reference meat product by no more than 20%, preferably no more than 15%. Depending on the area of application, the meat product used as a reference is selected from known meat products such as chicken, pork, beef or lamb. It should be noted that an L* value that is similar to an L* value of a reference meat product in isolation does not render a food product an alternative meat product. In order to qualify as an alternative meat product, the food product also has to meet the conditions as to texture and porosity described herein. For example, a snack product having an L* value that is similar to an L* value of a reference chicken product does not qualify as alternative meat product, for the obvious reason that texture and porosity of a snack product is not comparable to texture and porosity of the reference chicken product.

The protein-containing foamed food product produced according to the present invention is further characterized by a fibrillar, porous, longitudinally oriented and cross-linked structure. Upon drying, the individual layers do not fall apart from one another, but remain linked to one another.

The protein-containing foamed food product produced according to the present invention is further distinguished by a porous structure having closed cavities and homogeneous distribution of the cavities. The cavities preferably have a diameter of 100-300 µm with a normal deviation in the range of 50-70%. The present invention thus also relates to a protein-containing foamed food product, preferably obtainable by the method according to the invention described here, wherein the L* value of the foods deviate from the L* value of a meat product by no more than 20%, preferably no more than 15%.

The protein-containing foamed food product according to the present invention preferably has a fibrillar, porous, longitudinally oriented and cross-linked structure.

The present invention also relates to a protein-containing foamed food product, preferably obtainable by the method according to the invention described here, wherein the L* value of the food preferably deviates from the L* value of a meat product by no more than 20%, preferably no more than 15%, wherein the food has a porous structure having closed cavities and homogeneous distribution of the cavities, wherein the cavities preferably have a diameter of 100-300 µm with a normal deviation in the range of 50-70%.

The protein-containing foamed food products according to the present invention are characterized by a specific texture. These products have longitudinally oriented layers that are positioned around a central cavity. Preferably, these layers are not placed very compactly alongside one another, but are interrupted by small cavities. This results in a porous structure. According to a preferred embodiment of the present invention, the inventive foamed food products when drying out exhibits clearly recognizable individual layers that do not fall apart from one another, but are linked to one another at some points. The fibrillar structure is oriented longitudinally, corresponding to the die used in the manufacturing process.

The protein-containing foamed food products according to the present invention are characterized by a maximum force (peak force) which is required to break up the structure of the products during cutting or biting, which is in the range from 10-50 N, preferably 15-40 N, more preferably 12-20 N, in longitudinal direction ($F_L$) and in the range from 10-90 N, preferably 15-70 N, and more preferably 15-50 N, in transversal direction ($F_T$).

The maximum force can be determined using a Warnzer-Brazler blade set with a "V" slot blade (https://textureanalysis-professionals.blogspot.com/2014/12/texture-analysis-in-action-blade-set.html). This analysis helps to quantify the cutting or biting property of the product. All texture analysis measurements are made at room temperature of 25° C.

The blade set comprises a reversible blade, a slotted blade insert and a blade holder. The reversible blade has a knife edge at one end and a flat guillotine edge at the other. In operation, the blade is firmly held by means of the blade holder which screws directly into a Texture Analyser. The slotted blade insert is located directly in a platform and acts as a guide for the blade whilst providing support for the product.

The protein-containing foamed food products according to the present invention are cut transversally (right-angled to the flow direction of the extruded strand ($F_T$) as well as cut parallel to the flow direction of the extruded strand ($F_L$), and the respective maximum force (peak force) can be determined using the above Warnzer-Brazler blade set and expressed in Newtons (N).

In contrast to bread dough, the protein-containing foamed food products according to the present invention show a pronounced anisotropy with respect to their mechanical properties, i.e. their $F_T$ and $F_L$ values. The anisotropy index can be calculated from the ratio of the $F_T$ and $F_L$ values ($A = F_T/F_L$) and represents a measure of the fibrousness of the product.

Generally, for the protein-containing foamed food products according to the present invention the $F_L$ values are lower than their $F_T$ values, so that the protein-containing foamed food products according to the present invention exhibit an anisotropy index of >1, preferably >2, especially preferred in the range from 2-2.5, even more especially preferred between 2.1-2.4. The protein-containing foamed food product according to the present invention can be used as a basis (matrix) for cell cultivation because its porous structure has a beneficial effect on the growth of cells and the protein-containing foamed food product can also contain nutrients or other components suitable for cell cultivation, which can be e.g. provided in the pores of the foamed food product.

It is preferable to open the outer surface of the protein-containing foamed food product, at least in some areas, so that at least part of the pores are accessible.

The protein-containing food product, according to the invention, can also be used as animal feed. In a process following extrusion, the pores of the extrudate are enriched with additives common to animal feed, such as nutrients and/or flavouring substances.

The present invention also relates to a cooling die with one or more feed lines for enriching the extrudate with additives, such as nutrients, flavouring substances, oil and/or fat before the extrudate leaves the cooling die.

The invention is explained in more detail in the following on the basis of a few non-limiting exemplary embodiments.

A. Production of Wet Texturates

An extruder described above can be used as the extruder, for example, the PolyTwin BCTL-42 32L/D extruder from Bühler. Depending on the proteins used, the housing of the extruder is set to a temperature which is, for example, in the range from 80° C. to 180° C., preferably in the range from 120° C. to 160° C., particularly preferably in the range from 130 to 150° C. In this case, the housing of the extruder can be set to different temperatures, for example, in an entrance region to 120° C., in a middle region to 160° C. and in an exit region to 140° C.

The protein content in the dry raw materials is greater than 50% and is particularly preferably in the range from 60% to 90%. For example, vegetable proteins such as legumes or wheat protein can be used as proteins, but animal proteins such as milk protein can also be used. Furthermore, insect proteins or cell proteins, in particular from yeast, bacteria, microalgae, mould and the like, or a mixture of different proteins can be used. The extrudate can contain water, bouillon and/or an oil-containing flavoring component as liquids. The liquid particularly preferably has a temperature in the vicinity of its boiling point.

The dry raw materials are metered into the extruder where they are kneaded together with the liquid into a homogeneous composition under pressure and action of temperature (for example, in the range from 1 bar to 60 bar, preferably 8 bar to 20 bar, particularly preferably 10 bar to 15 bar). In the course of the method, the proteins are unfolded and align themselves into cross-linked filaments as they enter the cooling die. The composition heats up in the course of the process from ambient temperature to the temperature necessary for the denaturation of the proteins. For soy proteins, for example, this is around 140° C. A processing temperature of 120° C. has proven suitable for pea proteins or sunflower proteins. Depending on the quality of the raw material, 160° C. may also be necessary.

The extrudate is passed through a cooling device, for example, a cooling die, when leaving the extruder. This has the task of bringing the composition to a temperature level below the boiling point prevailing according to the ambient conditions, for example, to a temperature in the range from 50° C. to 90° C. In order to achieve this, cooling water having a temperature in the range from 40° C. to 90° C., preferably 50° C. to 70° C., is used in the cooling die.

In order to achieve improved wall sliding in the cooling die and thus easier process control, oil can be injected into a distribution body of the extruder and/or into the cooling die itself, for example, in a proportion in the range from 1% to 10%, preferably in the range from 2% to 6%, particularly preferably in the range from 3% to 4%, based on the total weight of all raw materials metered into the extruder. For example, an edible oil such as sunflower oil is used.

The extrudate is conducted through the extruder at a throughput which is in the range from 10 kg/h to 600 kg/h, for example, in the range from 10 to 60 kg/h, preferably in the range from 20 kg/h to 50 kg/h, more preferably in the range from 30 kg/h to 40 kg/h, or alternatively in the range from 100 to 600 kg/h, preferably 300 to 600 kg/h and particularly preferably 400 to 550 kg/h. The specific mechanical energy input introduced by the extruder can be in the range from 10 Wh/kg to 120 Wh/kg, preferably in the range from 15 Wh/kg to 30 Wh/kg; overall, it depends on the raw material mixture. The holding time (residence time) is preferably at least 2 minutes, preferably at least 4 minutes.

If the (micro)pore formation is generated by means of a chemical reaction, a salt and an acid should preferably be added to the dry raw materials. Possible salts are, for example, sodium hydrogen carbonate or potassium hydrogen carbonate. Citric acid, tartaric acid or its salt and glucono delta-lactone can be used as acids. In addition, phosphate-containing acid carriers are suitable, such as disodium dihydrogen diphosphate or monocalcium orthophosphate. The mixing ratios here can vary to control the amount of gas released. Ratios of salt to acid in the range 1:1 to 6:1 are preferred. $CO_2$ or $NH_3$ is preferably released as the pore-forming gas.

As an alternative to the chemical gas release described above, the (micro)pore formation can also be carried out by introducing a gas (preferably compressed under pressure). Examples include $CO_2$, $N_2$ and $SO_2$. The gas, which can be liquid, compressed under pressure, can be passed into the extruder, for example, via a hose. The gas flow can be regulated by means of a solenoid valve and a flow meter. The gases are preferably added in in the range from 0.05% to 5%, based on the total weight of the raw materials metered into the extruder.

The process flexibility can be significantly increased by using a preconditioning step. The residence time of the protein matrix in the process can thus be influenced. The residence time in the preconditioner can be in the range from 3 s to 600 s, preferably in the range from 3 s to 60 s, particularly preferably in the range from 5 s to 15 s.

An exemplary recipe for producing a meat imitation by means of a salt and an acid is as follows:

| Soy protein concentrate | 40% | 14 kg/h |
|---|---|---|
| Salt | 2% | 0.7 kg/h |
| Water | 57% | 19.9 kg/h |
| Sodium hydrogen carbonate | 0.75% | 0.27 kg/h |
| Citric acid | 0.25% | 0.087 kg/h |

For example, one of the following recipes can be used to produce a meat imitation by introducing a gas:

| Sunflower protein concentrate | 40% | 14 kg/h |
|---|---|---|
| Salt | 2% | 0.7 kg/h |
| Water | 57% | 19.9 kg/h |
| $CO_2$ injected in gaseous form | 1% | 0.35 kg/h |
| Pea protein isolate (protein content ≥ 75% dry weight) | 30-50% | 9-15 kg/h |
| Pea fiber (fiber content ≥ 50% dry weight, starch content ≤ 50% dry weight) | 5-15% | 1.5-4.5 kg/h |
| Sunflower oil | 0-10% | 0-3 kg/h |
| Water | 30-60% | 9-18 kg/h |
| $N_2$ injected in gaseous form | 4.6% | 1.38 kg/h |

The water content in the end product is advantageously greater than 30% and is preferably in the range from 30% to 70%.

The present invention is explained in the following with reference to non-limiting drawings and examples. Shown are.

EXAMPLE 1

In a 30 mm twin-screw extruder from Bühler with an additional gas supply unit (on the penultimate barrel segment in front of the cooling die) and kneading/mixing element at the position of the gas supply unit, the following raw material was processed at 145° C., 380 rpm, and a temperature of the cooling die of 60° C.:

| | |
|---|---|
| Pea protein isolate (Protein content ≥ 75% dry weight) | 43% |
| Pea fiber (fiber content ≥ 50% dry weight, starch content ≤ 50% dry weight) | 9% |
| Sunflower oil | 2% |
| Water | 46% |

The throughput was 30 kg/h. 23 g/min $N_2$ having a pressure of 15-30 bar were introduced into the extrudate.

The protein-containing food produced had an overrun at the die outlet (that is, a height exceeding the height of the extruder outlet and thus an enlarged volume of the sample) of 100% and, after cooling to room temperature at normal pressure, shrank to an overrun of 30-60%. The protein-containing foamed food product thus produced had very homogeneously distributed pores having a diameter of approximately 0.1-0.3 mm with a narrow size distribution.

EXAMPLE 2 (COMPARISON)

Example 1 was repeated with the difference that no nitrogen was introduced into the extrudate.

Color Measurements

The products from Examples 1 and 2 were measured using a conventional spectrophotometer with SCI (Specular Component Included). The sample to be measured had such a layer thickness that there was no transmission of light through the sample material and the measuring opening was completely covered with sample material. Reflection measurements were performed using a d/8° measurement geometry and with daylight (D65). L*, a*, b*, and C* values were determined. The results are shown in Table 1 in the following.

TABLE 1

| | L* (D65) | a* (D65) | b* (D65) | C* (D65) |
|---|---|---|---|---|
| Example 2 | 55.61 ± 0.17 | 11.10 ± 0.11 | 26.55 ± 0.09 | 28.77 ± 0.04 |
| Example 1 | 71.07 ± 0.16 | 7.22 ± 0.37 | 25.75 ± 0.87 | 26.74 ± 0.93 |
| Reference (chicken breast) | 79.66 ± 0.04 | 1.53 ± 0.24 | 13.96 ± 0.59 | 14.04 ± 0.61 |

The extrudate according to Comparative Example 2 had the lowest L* value at 55.61 and was therefore the darkest of all samples. The inventive extrudate according to Example 1 had an L* value of 71.06 and thus came close to the L* value of the reference sample (chicken breast at 79.66).

The extrudate according to Comparative Example 2 also had the highest red component at 11.10, while the proportion in the inventive extrudate according to Example 1 was lower at 7.22. An a* value of 1.53 in the reference sample (chicken breast) indicates an only slight red cast in the sample.

The yellowness, expressed by the b* value, was relatively the same in the extrudate according to Comparative Example 2 and in the inventive extrudate according to Example 1 (at 26.55 and 27.75 respectively). The chicken breast as a reference had a b* value of 13.96.

The C* value describes the chroma and can be calculated from the a* value and the b* value. It was similar in the extrudate according to Comparative Example 2 and the inventive extrudate according to Example 1 (at 28.77 for Example 2 and 26.74 for Example 1). The chroma of the chicken breast was lower at 14.04.

Figure 1:
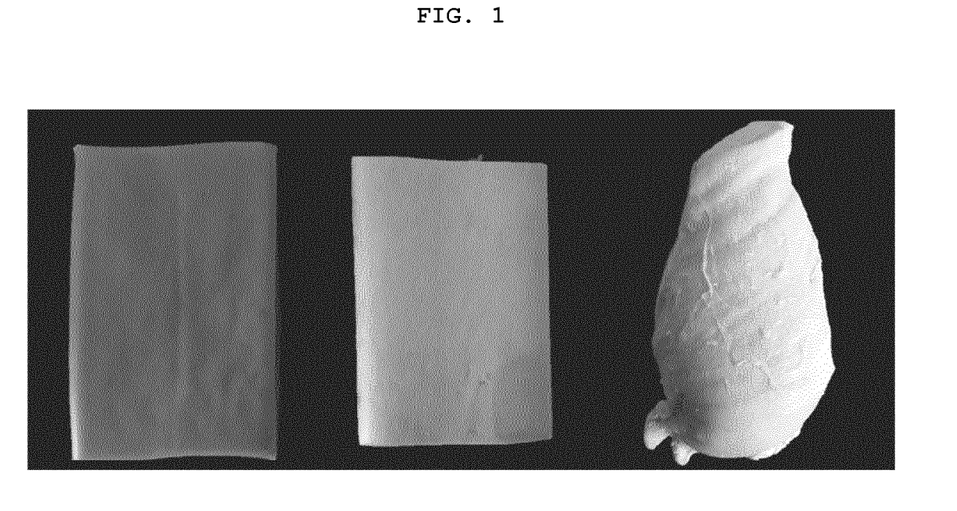
FIG. 1 a comparison of the color appearance of a product produced according to the invention with a product produced conventionally (without foaming) and a reference sample (chicken breast)

These color differences are shown in FIG. 1. FIG. 1, on the left, shows the product produced according to Comparative Example 2, in the middle, the inventive product produced according to Example 1 and on the right, the reference sample (chicken breast). It can be seen that the sample according to Example 1 comes considerably closer to the appearance of the reference sample.

Fibrillar Structure

Figure 2:
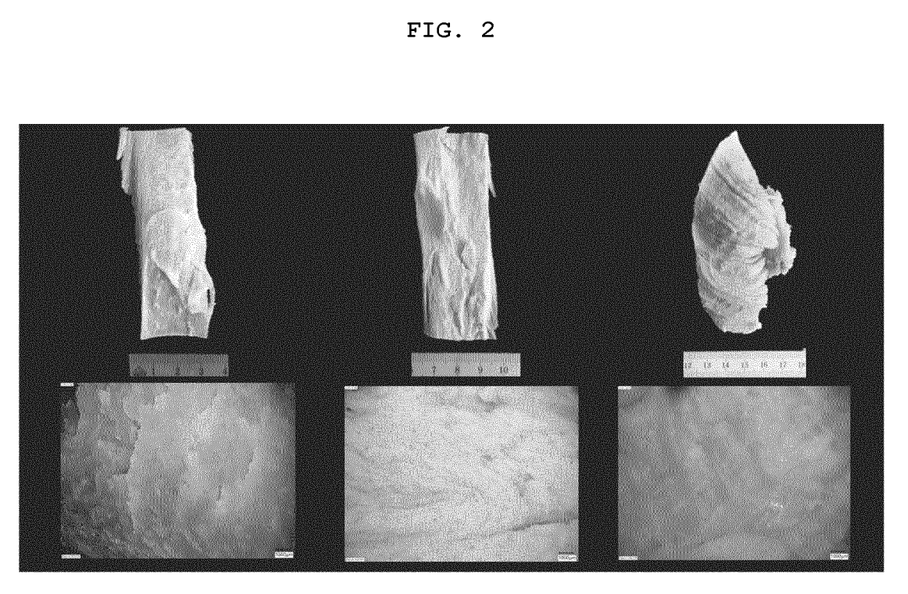
FIG. 2 a comparison of the fibrillar structure of a product produced according to the invention with a product produced conventionally (without foaming) and a reference sample (chicken breast)

The fibrillar structure is intended to describe the differences in the muscle fiber structure in a piece of meat (here a chicken breast as a reference sample) compared to the fibrous structure which is achieved by the thermal texturing of plant proteins. For this purpose, the extrudates according to Examples 1 and 2 were ripped open and the internal structure was analyzed macroscopically and microscopically. The result is shown in FIG. 2.

The product produced according to Comparative Example 2 was clearly built up in layers, wherein the inner core was straight in length. The layers were placed around it one after another. This reflects the shear force that was exerted on the material in the process and the die. Due to the high moisture content of the sample, these layers were held together relatively compactly. However, as soon as the product produced according to Comparative Example 2 was dried out in the air, the individual layers clearly fell apart from one another.

The inventive product produced according to Example 1 had a structure similar to that of the product produced according to Comparative Example 2 with regard to the longitudinally oriented layers. However, there was no inner core, just a cavity. The layers had then been placed around this cavity by means of the shear force. In this sample, these layers were not placed very compactly with one another, but were interrupted by small cavities. This resulted in a porous structure. As soon as the inventive product produced according to Example 1 began to dry out, not only did the individual layers become more clearly recognizable, but also the porous structure and the crosslinking that took place as a result. The individual layers no longer fell apart from one another, but were linked to one another at some points. The fibrillar structure of the two textured samples was oriented longitudinally, corresponding to the die in the thermal process. The reference sample, the chicken breast, is visibly more compact and more complexly networked.

Porosity

Figure 3A:
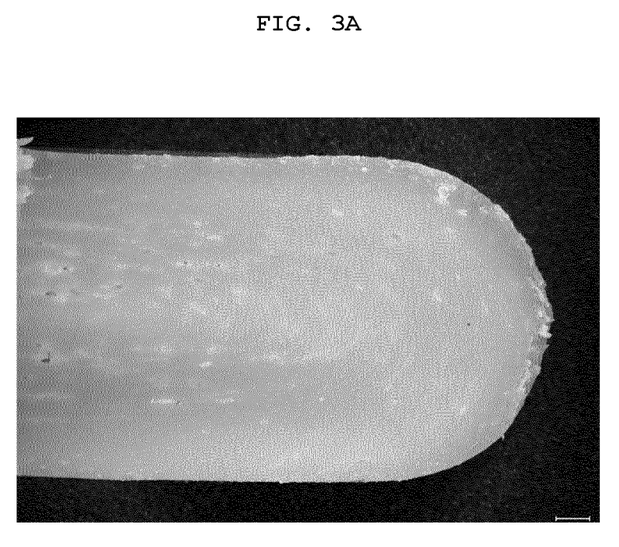
FIGS. 3a and b a comparison of the porosity of a product produced according to the invention with a product produced conventionally (without foaming)
Figure 3B:
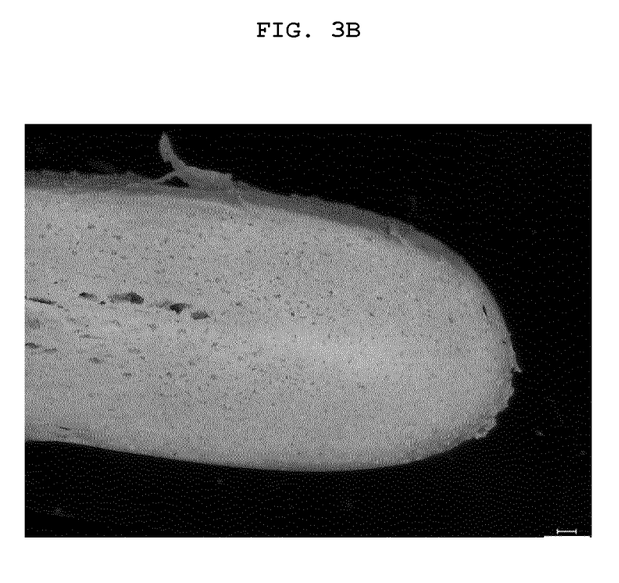
Figure 3C:
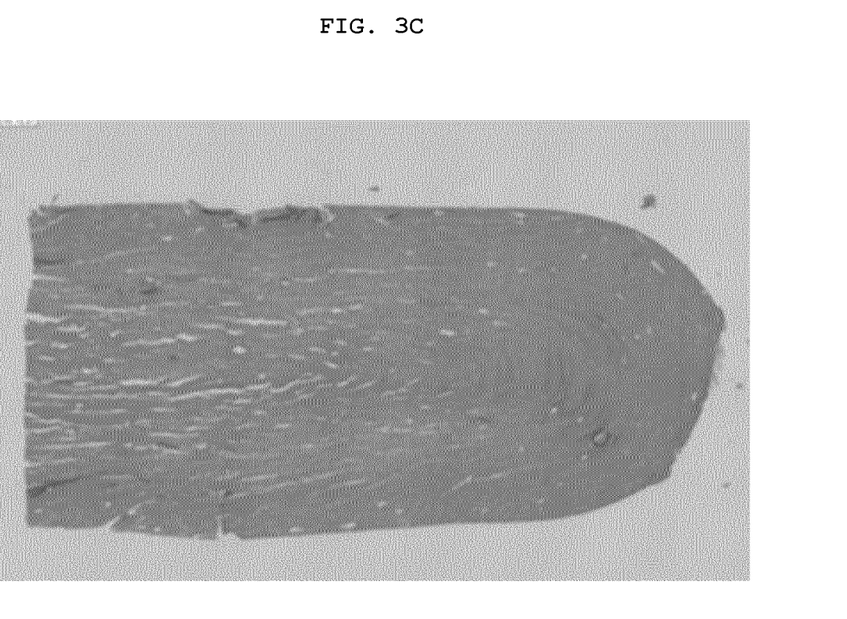
FIGS. 3c and d a further comparison of the porosity of a product manufactured according to the invention with a product manufactured conventionally (without foaming)
Figure 3D:
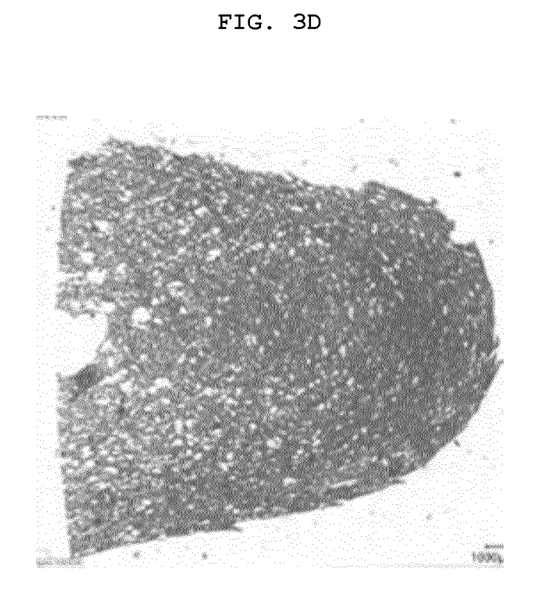

A thin section of each sample was made and a contrast between sample and pores was created by means of transmitted light. The images were recorded and processed by means of a VHX 6,000 digital microscope from KEYENCE. The result is shown in FIGS. 3a) and 3b).

It can be seen that the porosity was very pronounced in the inventive product produced according to Example 1 and thus also ensured structural cohesion in the dried state. The individual cavities were closed and had a homogeneous distribution, wherein the cavities on the outer edge were smaller. The closer to the center, the larger the cavities. The average area of a cavity was 21,292±36,110 µm² with an average minimum and maximum diameter of 125±73 µm² or 239±153 µm². The results are summarized in Table 2.

TABLE 2

|  | Area [μm²] | Circumference [μm] | Max diameter [μm] | Minimum diameter [μm] |
| --- | --- | --- | --- | --- |
| Average | 21192 | 866 | 239 | 125 |
| Normal deviation | 36110 | 791 | 153 | 73 |
| Max. | 721276 | 15354 | 2342 | 925 |
| Min. | 5683 | 274 | 91 | 35 |

The product produced according to Comparative Example 2 had only a slight irregular porous structure. Hardly any porosity was visible in the outer regions, while cavities were visible in the inner part. These are due to the layered arrangement during the process and underline the statement that the individual layers are poorly networked with one another and detach relatively quickly from one another after loss of moisture.

Texture

The maximum force (peak force) which is required to break up the structure of the products according to Examples 1 and 2 when cutting or biting was determined using a Warnzer-Brazler blade set with a "V" slot blade (https://textureanalysis-professionals.blogspot.com/2014/12/texture-analysis-in-action-blade-set.html). This analysis helps to quantify the cutting or biting property of the product. All texture analysis measurements were made at room temperature of 25° C.

The extruded samples were cut into square pieces of 30 mm×30 mm as part of sample preparation for the texture analysis. The samples produced according to example 1 and 2 having a thickness of 13-16 mm (Ex. 1) and of 10 mm (Ex. 2) were cut transversally (right-angled to the flow direction of the extruded strand ($F_T$) as well as cut parallel to the flow direction of the extruded strand ($F_L$), and the respective maximum force (peak force) was determined and expressed in Newtons (N). All measurements were performed three times.

Figure 4A:
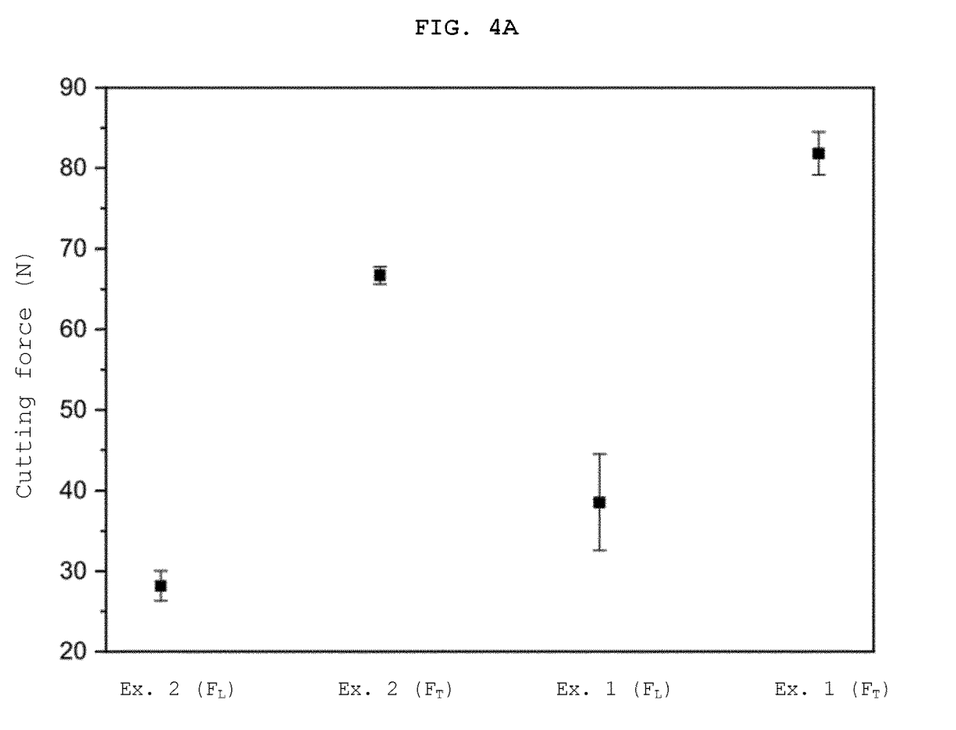
FIG. 4a a comparison of the texture values of a product produced according to the invention with a product produced conventionally (without foaming)

The cutting speed was set to 50 ram/min, and the cutting distance was 40 mm. The results are shown in FIG. 4a.

It can be seen that the inventive product according to Example 1 has a higher strength compared to the product of Comparative Example 2 in both directions of the cut ($F_T$ and $F_L$).

Figure 4B:
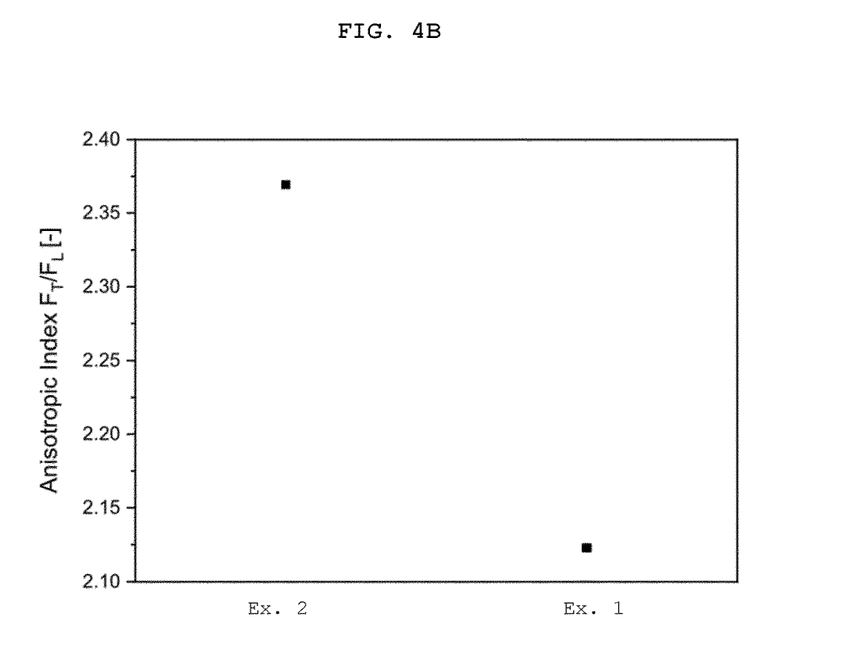
FIG. 4b a comparison of the anisotropy index values of a product produced according to the invention with a product produced conventionally (without foaming).

FIG. 4b shows the anisotropy index for both samples, which index can be calculated from the ratio of the $F_T$ and $F_L$ values ($A=F_T/F_L$) and represents a measure of the fibrousness of the product. The value for the inventive product according to Example 1 is significantly reduced compared to the value for the product of Comparative Example 2, which suggests an increased fibrousness of the inventive product according to Example 1.

The anisotropic index for meat products like chicken or beef were close to 1, ranging from 1.1-1.75, but for fish the anisotropic index was 4.95, indicating the high variation in the longitudinal and transverse texture of the fish.

Bread dough does not have any pronounced anisotropy with respect to the $F_T$ and $F_L$ values.

Figure 5A:
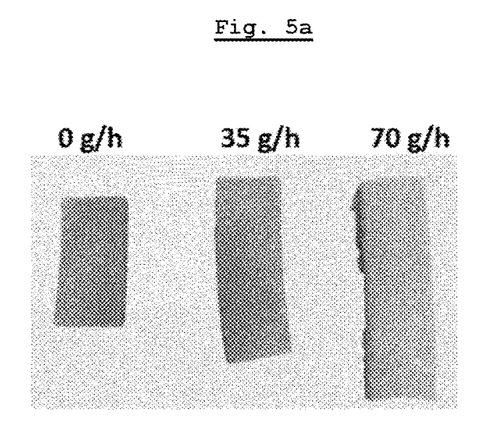
FIG. 5a to c a comparison of the appearance of products produced according to the invention with different gas injection rates FIG. 6 a comparison of the texture values of products produced according to the invention FIG. 7a a fluctuating texture profile of a commercial snack product FIG. 7b a fluctuating texture profile of a foamed product according to the invention FIGS. 8a and b a microscopic image of the porosity of a product produced according to the invention
Figure 5B:
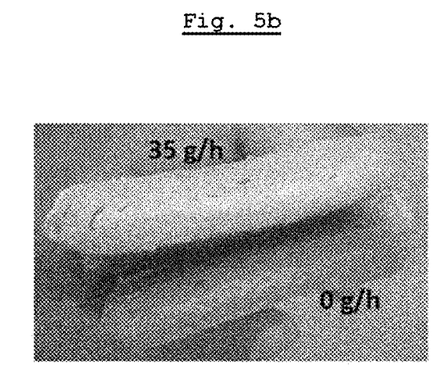

The texture profile for meat analogues was compared with extruded foamed snack product, and the difference in the texture was confirmed by the fluctuating texture profile of the snack product, 'knusperbrot' (FIG. 5a), compared to the smoother texture profile of the meat substitute (FIG. 5b). This is due to the fundamental difference in the texture of a 'knusperbrot' which is crunchy and thereby have multiple force peaks as the blade penetrates the sample.

EXAMPLE 3

In a 42 mm twin screw extruder from Bühler with an additional gas supply unit, the following raw material was processed at temperatures up to 152° C. and screw speed of 400 rpm:

| Pea protein isolate | 43.2% |
| --- | --- |
| Pea fiber | 8.8% |
| Water | 47.5% |
| Oil | 0.5% |

The gas injection rate into the extruders were kept at the rate of 0 g/h, 35 g/h, 52 g/h and 70 g/h in four different trials. The total throughput at the outlet of the cooling die was 35 Kg/h.

Texture (a) Analysis of Meat Substitutes

Figure 5C:
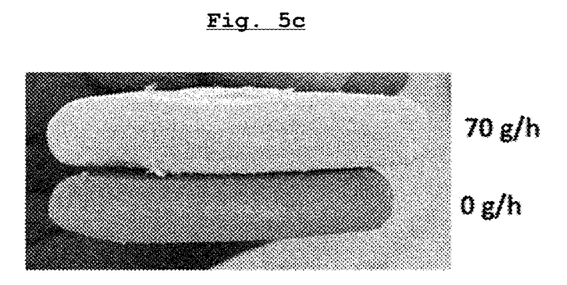

Texture analysis was carried out on the samples produced as per example 3. FIG. 5 represents the comparison of samples produced with 3 levels of gas injection rate. The maximum force (peak force) which is required to cut through the structure of the products in example 3 was determined using a Warner Bratzler Blade Set with a thickness of 1 mm. This analysis helps to quantify the cutting or biting property of the product. All texture analysis measurements were made at room temperature of 25° C.

Figure 6:
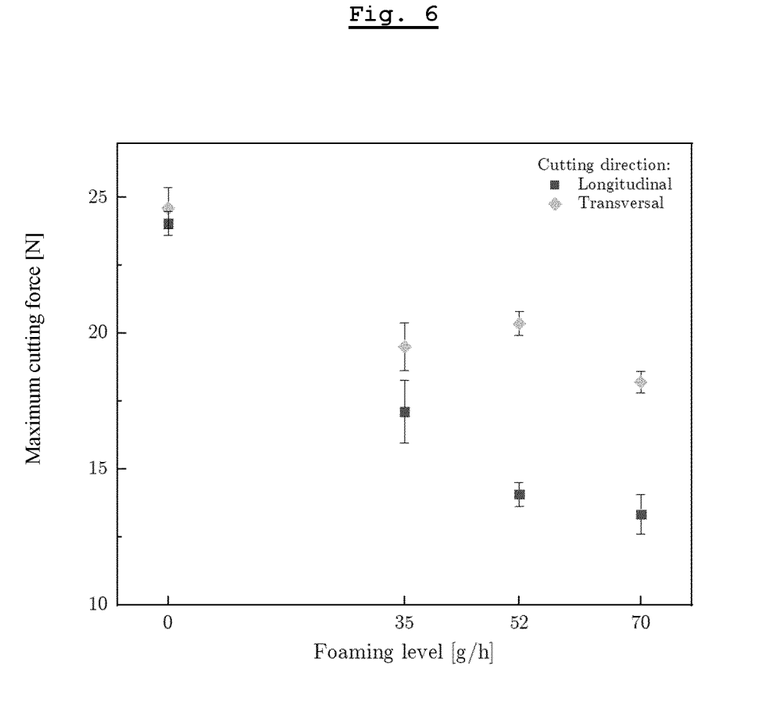

The extruded samples produced according to example 3 were cut into square pieces of 20 mm×20 mm as part of sample preparation for the texture analysis. The samples were then cut transversally (right-angled to the flow direction of the extruded strand ($F_T$) as well as cut parallel to the flow direction of the extruded strand ($F_L$), and the respective maximum force (peak force) was determined and expressed in MPa. For each cut direction, 6 replicates were taken. The results are shown in FIG. 6.

The ratio of cutting force in both directions was calculated and expressed as Anisotropic index ($A=F_T/F_L$). The A value for the foamed product with gas injection rate higher than 0 g/h lied between 1.1.-1.5, whereas this value for the non-foamed product was closer to 1.

(b) Analysis of Meat Products

For comparison purposes, the texture analysis was carried out for chicken, beef and fish products available in the market using a Warner Blatzer blade with 'Rectangular' slot blade (HDP/WBR) and thickness 1.016 mm. The cutting speed of the Warner-Bratzler blade was set to 1 mm/sec, and the blade was penetrated through the sample. The samples were measured at 25° C. A total of 3 replicates was measured for each sample.

It was found that the average of the maximum force for these meat and fish products ranged from 45.0 to 175.1 N in the transverse direction and from 10.0 to 99.9 N in the longitudinal direction.

The anisotropic index for meat products like chicken or beef were close to 1 ranging from 1.1-1.75 but for fish the anisotropic index was 4.95, indicating the high variation in the longitudinal and transverse texture of the fish.

Figure 7A:
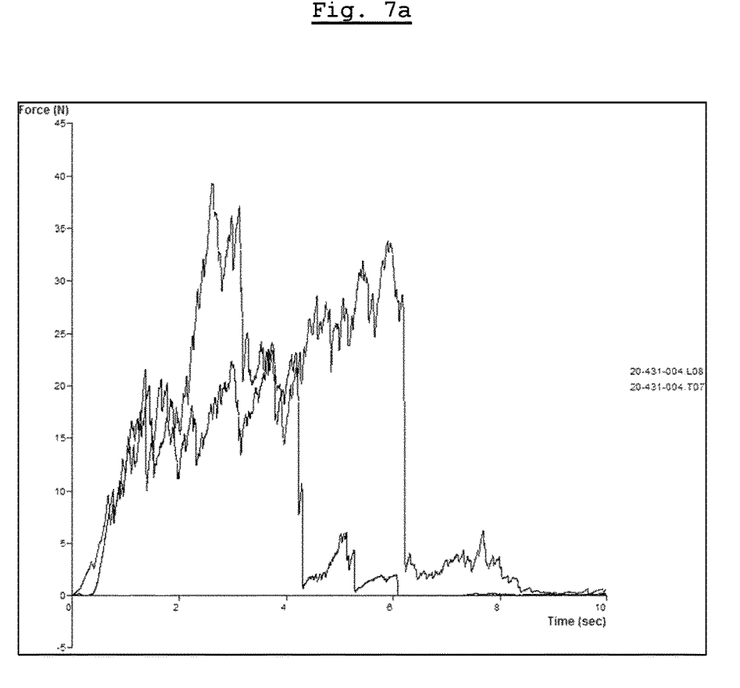
Figure 7B:
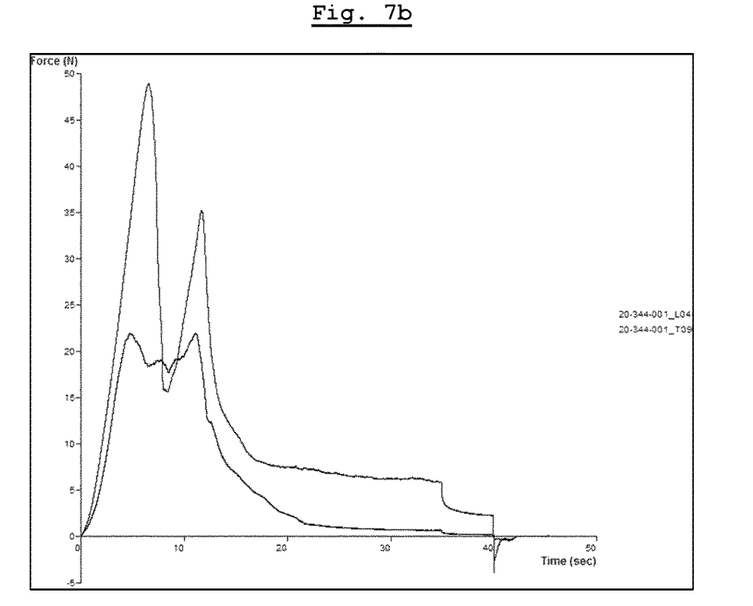

The texture profile for meat analogues was compared with extruded foamed snack product and the difference in the texture was confirmed by the fluctuating texture profile of the snack product, 'knusperbrot' (FIG. 7a), compared to the smoother texture profile of the meat substitute (FIG. 7b). This is due to the fundamental difference in the texture of a 'knusperbrot' which is crunchy and thereby have multiple force peaks as the blade penetrates the sample.

Figure 8A:
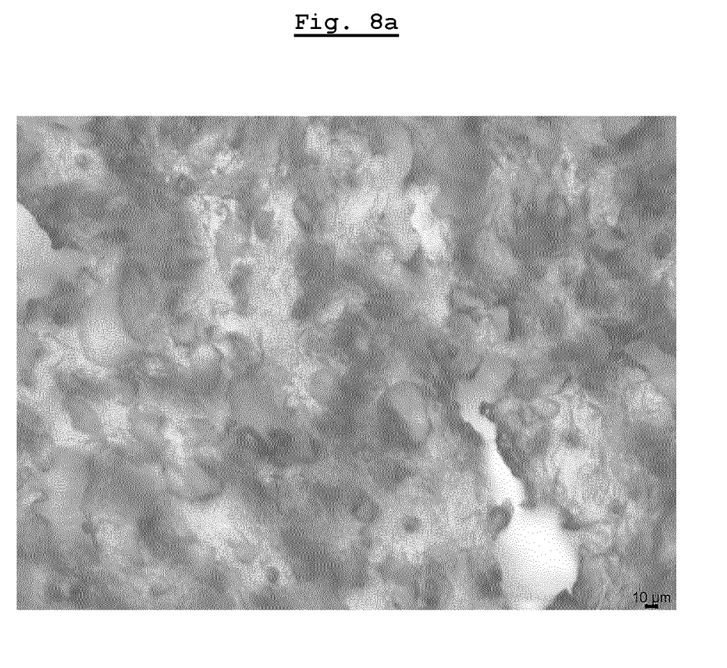
Figure 8B:
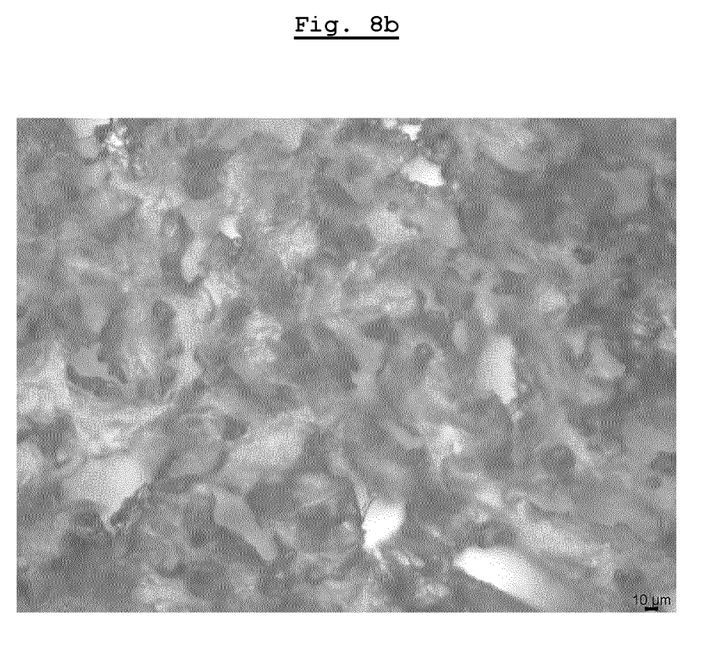

In FIGS. 8a and b, microscopic images of the porosity of a product produced according to example 3 are shown. The light microscopy (20×) image for the foamed product in example 3 with gas injection rate of 70 g/h shows the presence of interconnected pores inside the foamed product.

The invention claimed is:

1. A method for the production of protein-containing foamed food products, comprising:
   a) metering raw materials into an extruder, wherein at least one raw material is a protein, wherein a protein content in the raw materials, based on dry weight thereof, is greater than 50%, and a starch content in the raw materials, based on dry weight thereof, is not more than 50%, and the raw materials comprise at least one component which has a fiber content,
   b) mixing the raw materials in the extruder to produce a mixture,
   c) extruding the mixture to produce an extrudate, wherein the solids content of the extrudate is in the range from 20% to 60%; and
   d) leading the extrudate out of the extruder through a cooling die while cooling the extrudate to a temperature of less than 100° C., wherein a controlled pore formation is performed in the extruder by providing a gas, so as to provide after step d) a foamed product having a protein content in the range from 15-30 wt.-%, and a liquid content of 45-70 wt.-%.

2. The method according to claim 1, wherein the gas is provided in the extruder by introducing this gas into the extruder.

3. The method according to claim 2, wherein the gas is selected from the group consisting of $CO_2$, $N_2$, $N_2O$ or $SO_2$.

4. The method according to claim 3, wherein the gas is introduced into the extruder in an amount from 0.01 to 5% by weight, based on the total weight of the raw materials metered in step a).

5. The method according to claim 1, wherein a specific mechanical energy input introduced by the extruder is in the range from 10 Wh/kg to 120 Wh/kg.

6. The method according to claim 1, wherein a temperature in the extruder is set in the range from 80° C. to 180° C.

7. The method according to claim 1, wherein oil is injected into at least one of the distribution body of the extruder and the cooling die itself.

8. The method according to claim 1, wherein the foamed product has distributed pores having a diameter of approximately 0.1-1 mm with a narrow size distribution and distributed closed cavities.

9. The method according to claim 1, wherein the foamed product has a maximum force in the range from 10-50 N in longitudinal direction ($F_L$) and in the range from 10-90 N in transversal direction ($F_T$).

10. A protein-containing foamed food product, obtainable according to the method according to claim 1, wherein the foamed food product has a protein content in the range from 15-30 wt.-% and a liquid content of 45-70 wt.-%.

11. The protein-containing foamed food product according to claim 10, wherein said product is an alternative meat product.

12. The protein-containing foamed food product according to claim 11, wherein the L* value of the foamed food product deviates from the L* value of a meat product by no more than 20%.

13. The protein-containing foamed food product according to claim 12, wherein said product has a fibrillar, porous, longitudinally oriented and cross-linked structure.

14. The protein-containing foamed food product according to claim 13, wherein said product exhibits a maximum force in the range from 10-50 N in longitudinal direction ($F_L$) and in the range from 10-90 N in transversal direction ($F_T$).

15. The protein-containing foamed food product according to claim 10, wherein said product has a porous structure with distributed pores having a diameter of approximately 0.1-1 mm with a narrow size distribution, and with distributed closed and interconnected cavities.

16. The protein-containing foamed food product according to claim 10, wherein said product is a food product which comprises at least one vegetable protein, insect protein, cell protein, or a mixture of different proteins.

* * * * *